(12) United States Patent  
Osuna

(10) Patent No.: US 9,364,762 B2
(45) Date of Patent: Jun. 14, 2016

(54) PHYSICAL AND ENVIRONMENTAL SIMULATION USING CAUSALITY MATRIX

(71) Applicant: Angel Gaming, LLC, Phoenix, AZ (US)

(72) Inventor: Alex Osuna, Phoenix, AZ (US)

(73) Assignee: ANGEL GAMING, LLC, Phoenix, AZ (US)

( * ) Notice: Subject to any disclaimer, the term of this patent is extended or adjusted under 35 U.S.C. 154(b) by 104 days.

(21) Appl. No.: 13/830,444

(22) Filed: Mar. 14, 2013

(65) Prior Publication Data

US 2014/0267230 A1     Sep. 18, 2014

(51) Int. Cl.
| | |
|---|---|
| *A63F 13/825* | (2014.01) |
| *A63F 13/822* | (2014.01) |
| *A63F 13/58* | (2014.01) |
| *A63F 13/56* | (2014.01) |
| *A63F 13/55* | (2014.01) |

(52) U.S. Cl.
CPC .............. *A63F 13/822* (2014.09); *A63F 13/55* (2014.09); *A63F 13/56* (2014.09); *A63F 13/58* (2014.09); *A63F 2300/8082* (2013.01)

(58) Field of Classification Search
None
See application file for complete search history.

(56) References Cited

U.S. PATENT DOCUMENTS

2010/0198501 A1* 8/2010 Otani et al. ................... 701/201

* cited by examiner

*Primary Examiner* — Said Broome
(74) *Attorney, Agent, or Firm* — Quarles & Brady LLP

(57) ABSTRACT

A simulation engine for causing a local or distributed computing system to produce a simulation of a virtual world includes one or more program modules that improve the realism and memory management of the simulation. An overworld object includes data pertaining to a world map and data pertaining to parameters for instantiating one or more NPCs within the virtual world. The world map may include map nodes that track the NPCs thereon, and also retain terrain data in a map set. The map set may be a single array of characters, each character referencing a terrain configuration that may be stored on the local computing system. An NPC object may include a hierarchy of needs that governs the behavior of the NPC. The needs may be basic needs such as eating and sleeping, and may have increasing complexity, requiring the completion of tasks and subtasks to fulfill the need.

18 Claims, 3 Drawing Sheets

```
***********************
** nucleobases
***********************
*** A
*** C
*** E
*** G
*** N
*** T
*** Z
***********************
**genome sequence key
***********************
** 0 - biome related skin designation
** 1 - food preference
***      A - indiscriminate herbivore
***      C - fiber preferenced herbivore
***      E - glucose preferenced herbivore
***      G - pacifistic omnivore
***      N - mildly aggressive omnivore
***      T - hyper aggressive omnivore
***      W - mildly aggressive carnivore
***      Z - hyper aggressive carnivore
** 2 - lung type
** 3 - flight type
** 4 - semi-cognitive aggression (effects and affected by chromosome 5)
** 5 - communal aggression modifier (effects and affected by chromosome 4)
***      A - hyper territorial
***      C - lone wolf behavior
***      E - mildly social
***      G - mildly communal
***      N/T - communal hunters
***      W - communal nesters
***      Z - communal nesters and hunters
** 6 - base body type
** 7 - back leg type
** 8 - front leg/arm type
** 9 - additional size modifier (based in reference to chromosome 6)
** 10 - Strength Lifetime Stat Curve
** 11 - Defense Lifetime Stat Curve
```

FIG. 2

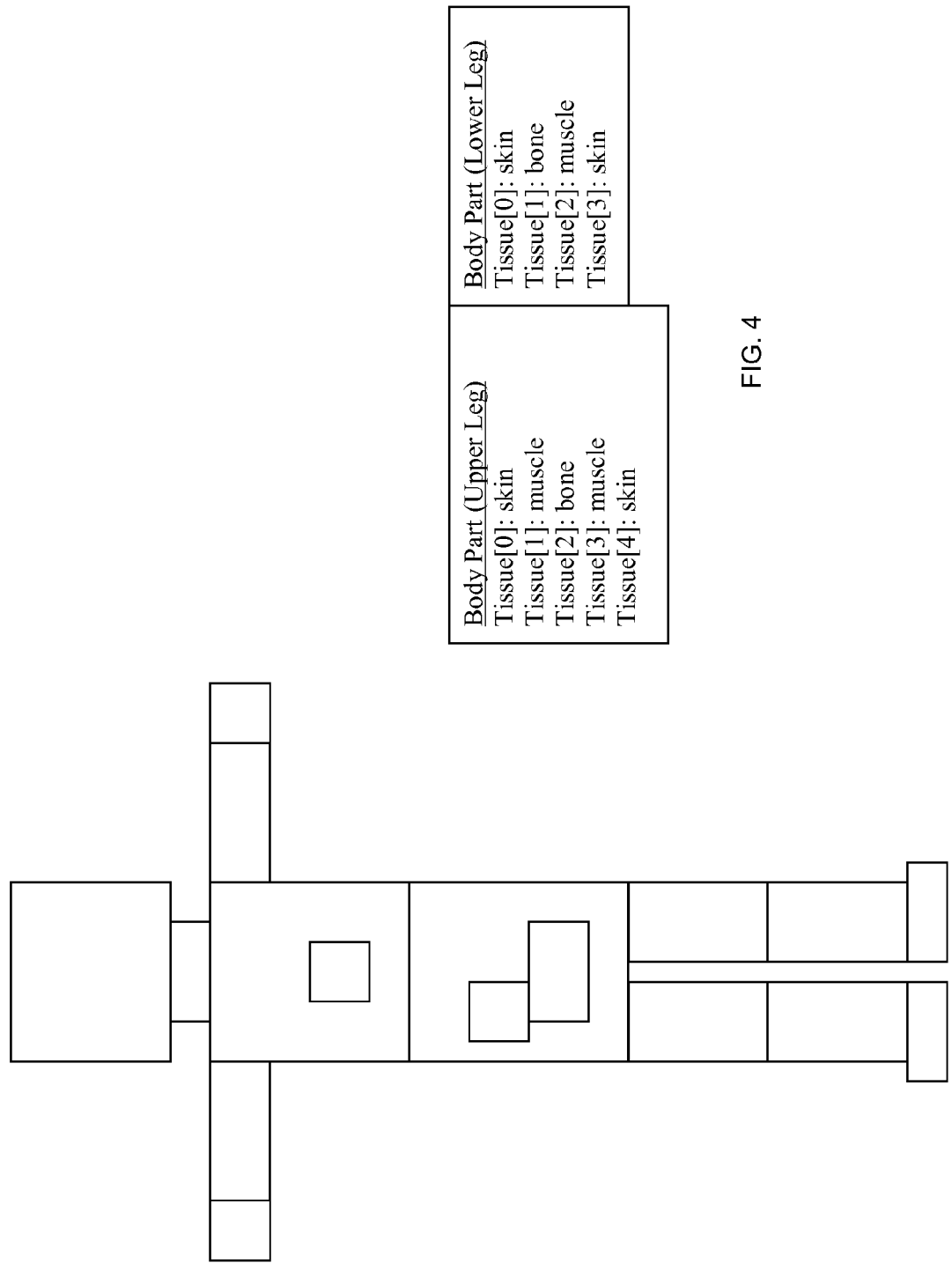

PHYSICAL AND ENVIRONMENTAL SIMULATION USING CAUSALITY MATRIX

FIELD OF INVENTION

This invention relates to methods of simulating a virtual world. This invention particularly relates to methods of implementing a causality matrix to manage interactions among populations in a memory-efficient simulated environment.

BACKGROUND

Realistic simulation of a virtual world and its population has long been an interesting engagement for computer programmers. Such simulations have wide application in academic fields such as math and statistics, anthropology, sociology, and digital humanities. Certain embodiments have found significant commercial or critical success in the video game industry; examples include Sid Maier's Civilization games and Maxis' SimCity and The Sims games. Of particular interest with respect to the present invention is the simulation game Slaves to Armok: God of Blood Chapter II: Dwarf Fortress ("Dwarf Fortress"). The intrigue of Dwarf Fortress is in its combination of procedurally-generated world terrain, semi-autonomous entity activity, and adept memory management to allow for complex simulations. These features provide a realistic virtual world populated by organic beings that appear to have unique personalities.

Environmental simulations continue to increase in complexity in order to more closely approximate a real-world environment. Unfortunately, simulations are both intrinsically limited by their own programming and externally limited by the available resources of the computer system executing the simulation. Intrinsic limitations arise where entity actions and interactions are hard-coded, because only a finite number of actions and results can be pre-programmed into the simulation. Because not every possible real-world situation may be represented with source code, a non-realistic repetitiveness of actions and results arises. External limitations arise when the simulation attempts to store and retrieve too much data from the memory storage locations of the computing system. A large population of simulated entities, or a large amount of complex simulation terrain, may tax the system too much, resulting in either poor performance or sacrifice of realism.

It is an object of this invention to provide a method of simulating a virtual world that makes entity interactions more organic. It is a further object of the invention to instill a hierarchy of needs in the entity. It is a further object to simulate entity interactions based on the desire to fulfill the entity's needs. It is another object to provide a simulated environment for the entity that properly manages the memory of the computer on which the simulation is running.

SUMMARY OF THE INVENTION

A method of generating a virtual world is provided, wherein an organic entity is simulated with a high degree of realism, in particular relating to the entity's interactions with its environment and other simulated entities. Rather than having predetermined courses and outcomes, the contributions of each entity to an interaction are managed by a causality matrix that may be unique to the entity. The causality matrix includes one or more needs arranged into a hierarchy, such that the entity's behavior is driven to satisfy parameters of the highest-priority unmet need. The needs in the hierarchy may comprise commonly-understood "human" needs, including food, water, sleep, and other physiological needs, shelter and security, companionship, knowledge, and achievement. The parameters of a need may be tasks that must be completed, in either a specific or random order, to fulfill the need. A task may further comprise a set of subtasks to also be completed. The causality matrix may further comprise a set of skills in which the entity may acquire proficiency. The acquired skills may affect the speed or quality in which the entity completes tasks or fulfills needs, and may also affect interactions with the environment or other entities. The causality matrix may further comprise a "store of knowledge," which is a set of observable facts about the virtual world that the entity has learned either directly or through other entities. Facts added to the store of knowledge may allow the entity to perform new skills or tasks or improve performance of known skills or tasks. The entity's capabilities may be limited or enhanced by biological characteristics, such as muscle mass, agility, and health, or by possession of useful or hindering items.

Entities are placed in a computer-generated environment having particular geological and ecological traits. An entity may fulfill its needs by modifying its surroundings, acquiring or creating useful items, or engaging other entities that may have needs that are aligned with or askew from the entity's needs. Modifying surroundings may include harvesting plants, corralling water sources, building structures, digging into the ground for mining or other purposes, or other tasks that fulfill a need. Items, such as tools or weapons, may be acquired, such as by theft or purchase, or fashioned from raw materials. Engagements with other entities may be friendly or hostile. Friendly entities may cooperate to fulfill common needs; as a cooperative group of friendly entities grows, societal behaviors emerge. Societal structures may vary in complexity according to the needs and capabilities of the involved entities. The simulation may include combat mechanics to determine outcomes of hostile encounters.

The complexity of the simulation requires careful real-time management of the memory of the computer on which the simulation is being run. In the preferred embodiment, the virtual world has sufficient complexity to simulate real-world environments in order to model behavior in populations with known behavioral motivations. The preferred implementation is therefore capable of generating up to about one million square miles of terrain inhabited by up to about one million entities.

BRIEF DESCRIPTION OF THE DRAWINGS

FIG. 2 is a diagram of an example of digital DNA.

FIG. 3 is a diagram of example body part objects in an NPC object.

FIG. 4 is a diagram of example tissue objects in example body part objects of FIG. 3.

Figure 1:
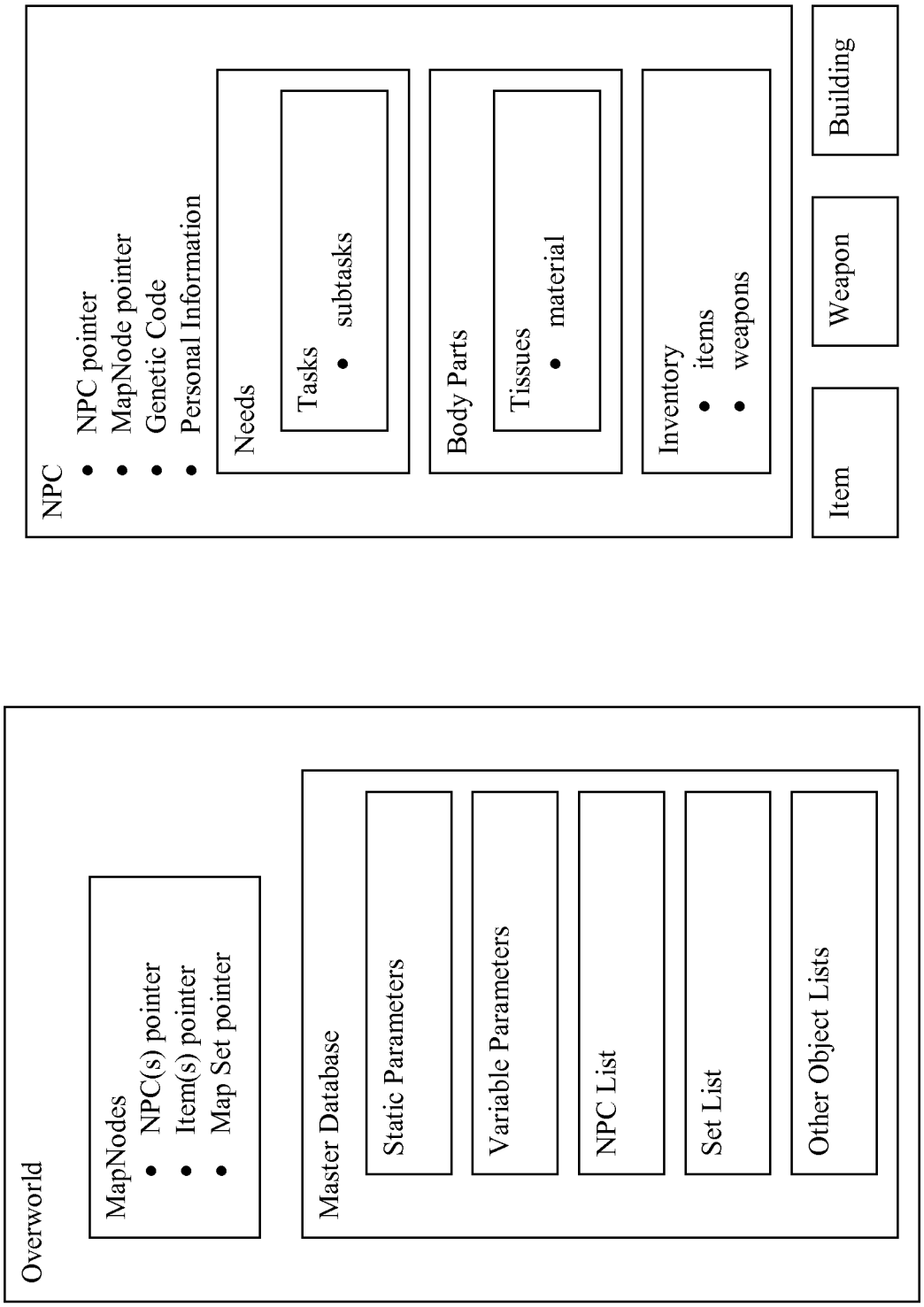
FIG. 1 is a diagram of one embodiment of object classes in the simulation.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

The invention will now be described more specifically with reference to the following embodiments. It is to be noted that the following descriptions of preferred embodiments are presented herein for purpose of illustration and description only. It is not intended to be exhaustive or to be limited to the precise form disclosed.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The various embodiments of the invention will be described in connection with systems and methods for simulating a virtual world, including simulating terrain, ecology, and other environmental components, and large populations of organic entities, referred to herein as non-player characters. That is because the features and advantages of the invention are well suited for this purpose. Still, it should be appreciated that the various aspects of the invention can be applied to other computer simulation and dynamic modeling environments.

Implementation

The preferred implementation of the virtual world simulation, generated by a simulation engine, may be objectively described as follows: an overworld object keeps track of game data, including at least a world map, a master list of non-player characters ("NPCs") that populate the world, and a database of static parameters defining physics in the world; map nodes for each location on the map keep track of the NPCs, buildings, and items that are on that node; an NPC includes a list of its needs, a list of its body parts, a list of items it possesses, and a flag indicating whether it is involved in an interaction and with what; items, weapons, and buildings contain their properties as described below. FIG. 1 illustrates one embodiment of an object-oriented layout of the world, described below. The various objects may be collectively implemented to create the virtual world simulation. Additionally or alternatively, the objects may be organized into one or more program modules that may be separately distributed and implemented to provide functionality pertaining only to those objects to another simulation engine.

Overworld Object

The overworld object contains sub-objects, static parameter values, and certain variable parameter values that pertain to high-level tracking and management of the world map and organic and inorganic objects therein. The overworld object may further contain pointers to some or all of the objects that are instantiated outside of the overworld object. The implementation may vary according to the size and complexity of the world map, the number and complexity of organic and inorganic objects and materials to be placed in the world, the parameters of the simulation, and the level of manual-versus-automatic generation of initial conditions in the simulation.

Preferably, the overworld object stores static and variable parameters in lists within a master database. Static parameters are assigned an unchangeable value at instantiation and are never removed, meaning their influence on the overall simulation remains constant. However, the engine may modify the effect of the static parameters for particular entities, items, buildings, or terrain. For example, if a NPC is wearing anti-gravity boots, the engine may reduce the effect of gravity, a static parameter, all the way to zero for its force calculations on that NPC. Static parameters may include, without requirement or limitation:

map size: total number of mapnodes described below, as well as the length, width, and height of each mapnode and the width and length of the map expressed in number of mapnodes;

physical properties: properties of the world's environment, such as gravity, temperature ranges, day length, season length, world age, and maximum and minimum values for parameters such as material properties, character properties, terrain material content, and worldwide water level;

terrain types: identifications, such as grassland, swamp, mountain, volcano, desert, jungle, wall, floor, solid, or empty; the identification may be associated with static or variable terrain composition parameters;

terrain composition: organic and inorganic materials, such as grass, trees, soil, mud, sand, clay, types of rock and other minerals, and water and other liquids, that may be present in the terrain; the engine may use a terrain tile's identification to determine the materials present in that terrain tile;

material properties: static properties for different materials, such as raw or refined minerals, refined metals, terrain materials, woods and other plant materials, liquids, tissues, weapons, and items; the properties may include weight, density, elasticity, hardness, conductivity, melting and freezing points, viscosity, surface tension, toxicity, and other typical physical properties of materials; the engine may use the material properties in calculations relating to modifying terrain, setting characteristics of instantiated tissues, weapons, or items, or determining results of combat or refinement;

entity properties: static properties for a set of NPC species, such as humans or humanoids, bipedal or quadrupedal animals, birds or other flying creatures, fish or other waterborne creatures, amphibians, and paranormal creatures such as ghosts; the properties may include standard body part arrangement, statistical values and hard-coded rates of change for physical and mental traits such as weight, height, muscle density, and intelligence; the engine may use the entity types and their properties in calculations relating to modifying terrain, setting characteristics of instantiated tissues, weapons, or items, or determining results of combat or refinement, as well as in determining the simulated characteristics of specific NPCs as they are affected by the NPC's genetic code, described below;

observable sciences: a static list of scientific fields of which individual NPCs or NPC groups may gain awareness as described below with reference to "knowledge progression;" sciences may include, without limitation, primary fields such as agriculture, physics, physiology, and chemistry, and the fields of science may include subfields, including nested subfields—for example, physics may have subfields including nuclear physics, ballistics, fusion, and electronics—which may belong to a plurality of primary fields; for example, thermodynamics and combustion may be subfields of both physics and chemistry; sciences may further include a list of interactions that increase the awareness level of one or more NPCs involved in the interaction, and the degree to which the awareness level should be increased; sciences may indicate that, when a proscribed level of awareness is reached, an NPC may obtain additional capacities, including without limitation: performance of new science-based interactions, such as making or using certain items or weapons; increased efficiency in performing interactions or fulfilling needs; and awareness of new sciences.

The static parameter list may further include a set of "digital DNA" parameters. Each NPC may have a genetic code, similar to real-world organic DNA, that determines certain physical and behavioral characteristics. The genetic code is determined at instantiation of the NPC as described below, and is selected from the digital DNA parameters. Preferably, the digital DNA parameters include a list of characters representing available nucleobases, and a genome sequence key. The genome sequence key is a numbered list of personal genetic attributes, the number of each trait corresponding to its position in the code. So, if the genome sequence key includes 30 trait entries, the NPC genetic code will be 30 characters long, each character being a nucleobase. Within the digital DNA parameters, each nucleobase is associated with a particular trait within each attribute. For example, if position 1 in the genetic code is associated with eye color, and the nucleobases are A, C, E, and G, the digital DNA parameters associate A with blue eyes, C with brown eyes, E with green eyes, and G with hazel eyes. An example of digital DNA parameters with a nucleobase list and a partial genome sequence key is illustrated in FIG. 2. The genetic code may further include positions that do not contain nucleobases, and instead contain references to other static parameters such as material properties or entity properties. The genome sequence key may include trait entries for these positions in the genetic code.

The genetic attributes may pertain to physical features, mental capacities, and behavioral predispositions. In one embodiment, five of the genetic attributes may pertain to the commonly recognized "big five" personality traits: openness, conscientiousness, extraversion, agreeableness, and neuroticism. The genetic code may provide for hereditary passing of physical, mental, and behavioral dispositions, evolution, and mutations. Heredity passing may comprise copying a portion of an NPC's genetic code when instantiating a "child" of the NPC. The genetic codes of two "parent" NPCs may be selectively combined in the child. The value of one or more genetic attributes may be selectively altered to represent a genetic improvement, thus effecting evolution of the species. Or, the value may be randomized, representing a mutation.

Variable parameters stored by the overworld object are also assigned a value at instantiation; however, that value may be zero or null if the parameter does not affect the initial conditions in the simulation. Variable parameter values may change as simulation time progresses, the parameters' effects changing with the values and possibly becoming ineffectual if the value drops to zero or null. Variable parameters may include, without limitation:

map properties: number of each map set type (described below), number of tiles of each terrain type, and number of inhabited tiles;

worldwide or regional properties: world time, overall population, regional population, population by entity type, temperature and weather matrices, total amount of each terrain material, localized water and pollution levels, world knowledge level, knowledge level by entity type, number of settlements, number of instances of each type of building, and number of instances of each type of weapon and item.

The master database may further include lists that keep track of particular in-world objects. In one embodiment, such an object list includes references to the listed objects, such as file names, library references, or pointers to the location in memory where the object is stored. Object lists may be static or variable depending on the type of objects they track: One object list, referred to as the "set list," may comprise a list of set characters and the memory location of the set each set character represents. Another object list, referred to as the "NPC list," may comprise a reference pointer to the NPC object for every NPC currently being simulated. Entries in the NPC list are added when the NPC is "born" into the simulation, and may be removed when the NPC dies or otherwise leaves the simulation. Alternatively the NPC list or another list may keep track of all deceased NPCs and may further change the NPC entity type to a ghost or other paranormal entity type.

Map Node Subobject

The overworld object further includes a map node subobject for each sector of the world. A map node subobject contains a map set, which is an array representing the terrain configuration at the map node's position on the world map, as described below. Related to the map set, the map node subobject may contain a composition array that describes the material and item content of the terrain at sequential heights in the map node. In one embodiment, for each character in the map set, the composition array includes the organic and inorganic material types present, and at what percentages. The engine may use the particular composition to determine actions and reactions that may take place at that point on the map. For example, the soil and rock composition may determine whether or not plants can grow and how long it takes for an NPC to dig through the terrain. The composition array may further include items that can be retrieved by NPCs. For example, the composition array may contain a quantity of units of a retrievable ore and an initial height of the ore. The engine uses this data to create item objects, described below, for each unit of ore at varying heights in the map based on the initial height.

The map node subobject may further contain references to any NPC object, building object, or item object that is present on the map node. In the preferred embodiment, the engine uses the NPC references within the map node subobject, rather than the NPC list in the overworld object, to simulate actions of the NPCs. This allows the simulation to be partitioned by map node. That is, where the world is iteratively simulated, some map nodes may be selectively processed at each iteration while others "sleep." A sleeping map node may be entirely skipped for simulation purposes, its properties and the properties of the NPCs and items thereon, if any, remaining static. Preferably, the engine, using the NPC references within the map node subobject, determines whether the map node contains any NPCs and only puts the map node to sleep if it contains no NPCs. This allows the engine to simulate the "important" map nodes—those containing NPCs—much faster by partially or completely skipping sleeping map nodes. However, even if no NPCs are present, the sleeping map node may contain items that should change over time without being manipulated, such as plants that grow and propagate. In this situation, the engine may include a processing routine that periodically awakens sleeping map nodes to update the status of items therein, then puts those map nodes back to sleep. A sleeping map node is also awakened when an NPC moves into it. In an alternative embodiment, the engine may put map nodes to sleep even if NPCs are located thereon. This embodiment may work in conjunction with NPC prioritization, described below, wherein the engine is only required to simulate NPCs having at least a threshold priority. A map node that contains NPCs may thus be put to sleep if none of the contained NPCs meet the threshold priority. The properties of sleeping NPCs may be held static or periodically updated as described above. Each map node subobject is associated with a position in the map set array described below.

Map Set

The terrain of the virtual world is represented by reference to the map sets contained in the two-dimensional array of map node subobjects. Specifically, the overworld object may contain a map_node_array[n1][n2] parameter, where n1 is the longitudinal position of the map node and n2 is the latitudinal position of the map node. The map node's map set determines the terrain configuration at that position on the map. Each map set represents a sector of terrain, the sector having predetermined dimensions. A map set is a string or an array of characters that the engine stacks vertically to represent the terrain at that map node. The number of characters corresponds to the height of the world map; that is, the first character in the array is the lowest point in the map, and the last character is the highest point. In this manner, world height or depth may be increased by simply adding characters to the array.

Each character in the map set represents a known volume of terrain. Preferably, each character represents one cubic mile of the simulated world. Each character may be associated with a stored terrain configuration. The terrain configurations may be stored in a database. In one embodiment, each terrain configuration may be a three-dimensional computer-generated graphic model, which may include one or more polygonal terrain meshes onto which one or more terrain textures are mapped, and may further include a height map and other data that describes the shape and composition of the represented terrain. In another embodiment, the terrain configuration may be a block configuration of a known number of blocks of uniform size. The block size translates to a specific height, width, and length in the simulated world. The block configuration may contain any number of blocks. In one example, the character represents one cubic mile of the world that contains a configuration of 18,000 blocks arranged 30 wide by 30 long by 20 high. Each block in this example represents an area 176 feet wide, 176 feet long, and 264 feet high. The three-dimensional arrangement of blocks, particularly whether a block is a terrain tile or is empty, may be represented by a three-dimensional binary matrix with zeroes representing empty blocks and ones representing terrain tiles. In another example, the block configuration contains a single block. Each block in the block configuration represents one terrain tile and contains an identifier for the terrain type of the represented terrain tile. The terrain types are stored in the master database as described above. Each terrain tile is either a type of terrain or is empty, representing that there is no solid ground in that space.

Each character in the map set may be a typical ASCII character that consumes one byte of memory storage. In a typical computer architecture where a byte consists of 8 bits, each byte-sized character may have a value of between zero and 255. This framework allows for representation of up to 256 discrete block configurations. Other frameworks may be used. For example, if each element's memory usage is increased to two bytes, or a single byte is designated to consist of 16 bits, the simulation may represent over 65 thousand different block configurations. In the preferred embodiment, the block configurations are stored in persistent memory, such as on a hard drive, of either the simulating computer or on a client computer that is accessing the engine's simulation, in advance of beginning the simulation. This way, the engine may quickly determine the proper block configuration to insert into the world while it is accessing the associated map node. Specifically, the engine simply reads each character in the map set to determine the needed block configuration and retrieves it. The engine therefore is not required to store every block or, alternatively, every segment of terrain in the physical or virtual memory of the computer on which the engine is running. This simulation method is advantageous in distributed computing environments, such as a massively multi-player online video game in which a server may simulate a game world containing hundreds or thousands of map nodes along with thousands of NPCs and instantiated player characters, the player characters being controlled from client computers that are remote from the server. The engine may simply retain in memory the character of the map set when processing a map node, rather than the entire geographical layout of the map node. The detailed map sets are stored on the client computers and rendered to the client computers' displays without consuming server memory resources.

Through sequential or parallel processing of adjacent map sets, the engine develops a height map for the simulated area, including underground structures such as caves, which are empty terrain tiles beneath terrain-filled ones. Each map set may be randomly or procedurally generated, or it may be hard-coded and stored in one or more files on the computer. In an embodiment where the map sets are hard-coded, each map node subobject may contain an identifier for the map set to be placed on that map node. The identifier may be a single character, allowing for up to 256 discrete map sets to be used by the engine. The map set may be rendered in three dimensions using a graphics rendering module, which may be a part of the engine or a separate computer program.

Terrain Modification

The simulation may provide for the terrain represented by the map sets to be modified, such as by weather, seismic activity, NPC interactions with the terrain, or player interactions with the terrain. The engine may modify the map set by determining which terrain configuration within the map set is to be modified. The engine further determines the modification to be made. The engine then identifies a replacement terrain configuration that will most accurately reflect the desired modification to the existing terrain. In one embodiment, the engine may search the database of stored terrain configurations for a replacement terrain configuration that approximates a combination of the existing terrain configuration with the modification to be made. For example, to simulate the impact of a 160 feet diameter meteor on a square mile of substantially flat ground, the engine searches the database for a terrain configuration having substantially flat ground surrounding a crater of about 4000 feet in diameter and 170 feet in depth, and selects the closest match as the replacement terrain configuration. The engine may replace the character of the existing terrain configuration in the map set with the character of the replacement terrain configuration. Upon the next iteration of the simulation, the terrain in the map set will be correspondingly altered.

In another embodiment, the terrain configurations may be classified according to a classification scheme that groups terrain configurations according to dominant features therein. For example, ground-level terrain configurations may be classified per their terrain features, such as flat, concave, hilly, or mountainous. The terrain configurations may further be classified per their environmental features, such as their biome, which may be forest, desert, jungle, plains, swamp, and the like. The terrain configurations may be further classified per their one or more modified features, such as fissured, cratered, flooded, excavated, or unmodified. The engine may then search for the proper replacement terrain configuration using the classification scheme. For example, if a mountainous, unmodified forest terrain configuration is subjected to an earthquake, the engine may search for a mountainous, fissured forest terrain configuration; if a mountainous, excavated forest terrain configuration is subjected to an earthquake the engine may search for a mountainous, excavated, fissured forest terrain configuration. In this manner, the number of terrain configurations to be searched is limited to only the most relevant terrain configurations.

In a typical simulated world, most of the map sets may be either above the ground level, and thus empty terrain configurations representing sky, or below the ground level, and thus either full terrain configurations representing completely solid ground or terrain configurations having caves or tunnels therein. In a simulation where NPCs excavate underground terrain configurations to obtain resources therein, i.e. mining, it may be advantageous to classify each underground terrain configuration according to whether or not an NPC can traverse the terrain configuration along one or more of its axes. An NPC traversal path, which for an underground terrain configuration may be considered a tunnel crossing the entire terrain configuration along one of its x, y, or z axes, is referred to herein as an "exit." In one embodiment, the underground terrain configurations may be classified per their available exits. This creates nine terrain configuration classifications: (1) empty configuration, (2) full configuration, (3) exits along x-axis, (4) exits along y-axis, (5) exits along z-axis, (6) exits along x and y axes, (7) exits along x and z axes, (8) exits along y and z axes, and (9) exits on all axes. The classifications may be used to encode terrain alterations in a database. That is, the database stores the terrain configuration classification that will result from combining each terrain configuration classification with each of the other classifications. For example, the engine stores that the combination of a terrain configuration having x-axis exits (configuration (3) above) with a terrain configuration having z-axis exits (configuration (5) above) is a terrain configuration having exits on the x and z axes (configuration (7) above). This may be expressed in a two-dimensional array, such as "combine[3][5]=7." The engine may then use the hard-coded terrain alterations to transform the simulated world. For example, if an NPC performs a "dig" interaction on the terrain configuration below the terrain configuration in which the NPC is located, this indicates to the engine to add a z-axis exit to the lower terrain configuration. The engine determines the current classification of the lower terrain configuration and then determines, from the stored alterations, the resulting terrain configuration classification from combining a z-axis exit configuration with the current lower terrain configuration classification. The engine then changes the lower terrain configuration to the most appropriate stored configuration.

NPC Object

The NPC object represents an organic entity that has been instantiated in the simulation. The NPC object may contain biographical information, in the form of text strings, such as the name, age, title, home settlement, and other personal information of the character the object represents. The NPC object may include references to other NPCs or to NPC groups to indicate relationships, such as marriage, parentage, employment, military or guild affiliation, and other relationships. The NPC object may contain a mapnode reference indicating on which set the NPC is located, and may further include a location reference indicating where in the set it is located. The NPC object may also contain a "home" mapnode reference indicating where its settlement is located. The NPC object may further contain objectives or targets that give operating instructions to the NPC as described below. The NPC object may be assigned a static or variable priority level relating to the NPC's importance to the simulation. In one embodiment, the priority level of all NPCs is set at instantiation, and the engine may simulate NPCs that are at or above a particular priority level at each iteration of the simulation. This approach conserved processing resources by skipping or delaying the processing of NPCs whose behavior is not immediately relevant to the simulation. In another embodiment, the engine may simulate at a constant priority level, while the priority levels of the NPCs change depending on whether they are performing tasks or require satisfaction of needs, as described below.

The NPC object contains sub-objects pertaining to the NPC's physical and behavioral attributes and the NPC's possessions. The NPC object includes one or more body part subobjects and a series of references indicating the physical relationship of the body parts to each other. The NPC object may further include one or more need objects and a series of references indicating the hierarchy or priority of the need objects. The NPC object may further include an inventory object containing references to items or weapons the NPC is carrying.

Body part subobjects represent the NPC's physical composition to a desired degree of abstraction. For example, as illustrated in FIG. 3, a humanoid NPC has body part subobjects for the following: head, neck torso, abdomen, left and right arms, left and right hands, left and right upper legs, left and right lower legs, left and right feet, left and right eyes, left and right ears, heart, stomach, liver, and brain. The choice of body parts to be represented depends on the desired complexity and the intended physical composition of the NPC. In another example, a worm-like NPC has just one body part subobject representing the worm's body. The spatial arrangement of body part subobjects may be a static parameter tied to the NPC's entity type and stored in the overworld object as described above. When a new NPC is instantiated, the NPC object may obtain the body part parameters and spatial arrangement from the overworld object and use this "default" arrangement as a template. A particular instantiation may then be modified by applying one or more scalars to the body part properties. In one embodiment, each body part subobject contains parameters that describe the represented body part's length, width, and height, and further describe the body part's position on a grid using X, Y, and Z coordinates. The values of these parameters may initially be default values contained in the overworld object lists; the engine may then modify these values by application of scalars.

Each body part subobject contains one or more tissue subobjects and a series of references that represents "layering" of the tissues. For example, as illustrated in FIG. 4 for the humanoid NPC of FIG. 3, an upper leg body part subobject contains five tissue subobjects and a lower leg body part subobject contains four tissue subobjects. The layered relationship represents a side view of the body parts. Each tissue subobject contains a reference identifying the type of tissue. In FIG. 4, the tissues are layered as follows from top to bottom: in the upper leg, skin, muscle, bone, muscle, skin; in the lower leg, skin, bone, muscle, skin; the "front" of the lower leg lacks a muscle layer because it is the NPC's shin, which is effectively skin over bone. Each tissue subobject may have a weight parameter, which the engine uses to determine the tissue density by multiplying the weight with the static material density contained in the overworld object. The tissue subobject may further include a flag indicating its condition, such as intact, tender, torn, punctured, broken, repaired, or infected. The tissue subobject may further include one or more modifiers, such as a strength modifier to indicate to the engine that the static tissue density should be multiplied by the modifier. In one embodiment, an overall physical modifier may indicate the NPC's level of physical development; the effect of the modifier may be improved through performance of physical interactions as described below. Tissue subobjects may be added to or removed from the body part subobject. In this manner, clothing or armor "worn" by the NPC may be represented as tissue layers on the outside of the body part.

The NPC object may further maintain, as a sub-object, a hierarchy of needs that governs the NPC's behavior. The hierarchy may be a variable data structure, such as an ordered list or node tree, comprising references to one or more need objects described below. The NPC object may also maintain, as a sub-object, a store of knowledge indicating the degree to which the NPC is aware of the observable sciences. The awareness, which increases as described below with respect to "knowledge progression," may be stored as an integer or decimal value for each observable science.

Weapon and Item Objects

The weapon and item objects contain a textual description of the weapon or item, and a set of characteristics related to the weapon's or item's use. A weapon object may include a reference to the weapon type, physical characteristics such as material and weight, effectiveness statistics such as speed and type of damage, and use requirements such as the required amount of free inventory space, the strength of the NPC to wield the weapon, and the number of hands required to use the weapon. An item object may include references to the item type and its characteristics. The characteristics of the item depend on the type of item. For example, a food item may have a type of food, an amount present, a quality index, and an array of ingredients.

Organic substances such as living, growing, procreating plants may be represented by item objects. These items may include parameters representing how many plants are present and the health of the plants, which may be affected by NPCs such as when a tree is chopped down for lumber. The engine may track and update these values. For example, as time passes the engine may increment the number of healthy plants in an item to reflect procreation, and when a threshold number of plants is reached the engine may add plant items to adjacent nodes to represent the spread of the plants.

Building Object

A building object contains a reference to its building type. The building object may further include a flag indicating whether it is an active facility. A facility may be used to perform specific tasks, such as refining materials, creating or storing items, or providing sleeping quarters for NPCs. Building types may be stored as static or dynamic architectural models, having structural parameters that can be affected by simulated events.

Need Object

A need object describes, essentially, a mental requirement that the NPC seeks to fulfill by performing tasks. Needs may be basic needs, such as a need to satisfy hunger, find shelter, mate, or procreate. Needs may be increasingly complex, such that tasks to complete have several subtasks and a sequential order in which they are to be completed. In one embodiment, a need object includes a plurality of variables that determine the need's place in the hierarchy, particularly the timing of when the need should become the top priority need. These variables may include, without limitation:

a need type indicating the pertinence to processing the NPC, such as critical, non-critical, avoidable, toggling, and localized; the engine reads the need type to determine how to affect the NPC in light of the needs status—if a critical need is completely unfulfilled, it may degrade the NPC's mental or physical composition until it is met or the NPC dies, while an avoidable need may be simply reset to fulfilled without affecting the NPC; a toggling need may be simply set to met or unmet without consideration for gradual decay as described below; a localized need must be performed at a particular location, such as at the NPC's home;

a tier, which is a high-level, preferably numerical, priority grouping that begins to interrelate need types as described below;

fulfillment mechanics, such as: a fulfillment level, which is a numerical value that increases as the need is being serviced and decreases when the need is not being serviced; lower and upper numerical thresholds that indicate the fulfillment level value at which the need becomes unfulfilled and fulfilled, respectively; a limit indicating the highest numerical value of the fulfillment level; and a rate of decay, which sets how quickly the fulfillment level decreases while the need is not being serviced;

a target, which may be a pointer or plain textual reference, such as a character string, to an object, such as an NPC object, item object, map node subobject (i.e. a destination), or other object; alternatively, the target may be an array containing pointers to multiple objects needed to fulfill the need.

Need objects have a hierarchy that is maintained by the NPC. The NPC may acquire its need hierarchy at instantiation. In one embodiment, each entity type has a default hierarchy of needs that is maintained by the overworld object. The NPC acquires the hierarchy as a template of its own hierarchy of needs, which is a series of need objects within the NPC object that are referentially related as described above. The engine may then adjust the hierarchy by adding or removing needs and associated tasks according to any unique characteristics of the NPC. Adjustments may be made at instantiation, such as when an NPC object includes a genetic code that predetermines some behaviors, thus affecting instantiation and prioritization of needs. That is, the instantiation process may include applying one or more modifiers to the hierarchy template to affect the tier, order, fulfillment mechanics, targeting, and task or subtask listing of one or more of the needs. In one example embodiment, an NPC's genetic code contains one or more modifiers representing levels of aggressiveness that affect cognitive, semi-cognitive, or non-cognitive needs. In one embodiment, a modifier for "communal aggression" may affect semi-cognitive needs, such as a need to hunt and a need to find shelter, by imparting a degree of social behavior upon the semi-cognitive needs. For example, the need hierarchy is affected by the NPC's communal aggression type as follows:

first type: communal, hyper-territorial—the NPC is instantiated with a need to hunt other NPCs in its map node; this need has the highest priority, even higher than non-cognitive "survival" needs such as feeding, and the NPC may even target NPCs of its own entity type to eliminate or chase away; however, the NPC also has a need to find shelter with other NPCs of its own entity type, so when the need to hunt is fulfilled, the NPC will look for NPCs of its entity type and nest with them; this first type illustrates how the NPC's genetic code can make the NPC and its surrounding population unstable—the NPC may kill or chase off its cohabitants when the need to hunt once again becomes the NPC's priority;

second type: solitary, nomadic—the NPC's genetic needs to socialize and to find shelter are removed or severely attenuated at instantiation, but no aggressiveness is added, so the NPC may not eliminate surrounding NPCs as in the first type unless that aggressiveness is otherwise imbued by the genetic code;

third type: mildly communal, nesting—the NPC is instantiated with a need to interact with NPCs of the same entity type and a need to create shelter; "mild" communality means the need to socialize is placed in the same tier as the need to create shelter, so that the NPC may live alone if the need for shelter is satisfied before the need to socialize, or with other NPCs if the need to socialize is fulfilled first;

fourth type: communal nesting, solitary hunting—the NPC is instantiated with a need to hunt other NPCs on a higher tier than a need to socialize, so that the NPC will first hunt on its own to fulfill the related need, then seek out other NPCs with which to nest; the hunting need object's tasks may specify the entity types that the NPC prefers to hunt;

fifth type: communal, nesting—the NPC is instantiated with a need to socialize, and the NPC's default need to find shelter is linked to its need to commune, so that the NPC prefers to find a home with other NPCs of its entity type because it fulfills two needs simultaneously; or, the NPC's default need to find shelter is modified to include the task of searching for another NPC of its entity type before finding a home together; in this instance, because the NPC has first found other similar NPCs to live with, the NPC may then hunt in a pack with its cohabitants;

sixth type: communal, nesting and hunting—the NPC is instantiated with a need to socialize on the same tier as a need to find shelter, followed by a need to hunt on the next lowest tier; the need to find shelter is linked to the need to socialize, so that the NPC prefers to live with other NPCs of its entity type, creating a communal living behavior; or, the NPC is instantiated with a need to find shelter that includes the task of searching for another NPC of its entity type to live with; because the NPC is living in a group when its need to hunt becomes prioritized, the NPC hunts in a pack.

Need objects may be added to or removed from the NPC object, and corresponding adjustments to the need hierarchy made, during the simulation as well. New needs may be added by interactions with other NPCs, with other objects such as item objects or weapon objects, or with the world itself. For example, a "teacher" NPC may be capable of teaching a subset of all of the possible needs. By a "teach" interaction by the teacher or a "learn" interaction by a "student" NPC, the engine may add a taught need from the subset to the student NPC's hierarchy. A need that was basic may be modified to be more complex depending on the characteristics of the NPC. For example, an NPC that has satisfied its need for shelter by finding a cave, and then learns how to make lumber from trees, may no longer be satisfied by the cave and may add tasks to its need for shelter, namely, building a house. "Building a house" then has a subtask of acquiring lumber, which may have a subtask of cutting down trees.

For each NPC processed by the engine, one need is "active" at all times. The active need interjects instructions to the NPC to control its behavior. The instructions are related to the highest priority task or subtask to be completed in order to further the goal of satisfying the active need. When the active need is fulfilled, it becomes inactive and the next need in the hierarchy becomes active. The active need may be interrupted and subsumed by an inactive need if the inactive need has a higher priority, or if a task or subtask in the active need cannot be completed or includes a "wait time" of NPC inactivity, such as when the NPC is boiling water. However, a need, task, or subtask may include a flag that indicates that the need, task, or subtask cannot be interrupted once it has begun to be processed. If a task or subtask of the active need is common to one or more other needs, those other needs may be passively fulfilled in whole or in part by completion of the common task or subtask. For example, a need to hunt and a need to eat may each include subtasks of searching for an animal to kill and killing the animal. Regardless of which of the two needs is the active need, the subtasks will be simultaneously completed and the fulfillment level of both needs will increase.

Interactions

An interaction is an instruction to the engine to change the properties of the objects involved in the interaction. An interaction may be between one or more initiating NPCs and a target, which may be a map node, an item, weapon, or other object, a building, or one or more other NPCs. In one embodiment, each interaction may have defined effects on the initiating NPC and the target, and may further have defined effects on other objects that are not directly involved in the interaction, i.e., the affected object is not the initiating NPC or the target. In such an embodiment, the interaction has predictable simulated results. For example, the interaction "eat a fig" will, upon execution, remove the instantiated fig item and increase the fulfillment of the initiating NPC's "hunger" need. The defined effects of the interaction may be adjusted by one or more modifiers including, without limitation: values of one or more parameters in the initiating NPC or target, such as age, weight, rank, muscle density, material properties, weapon properties, and the like; one or more scalars that may be unique to the initiating NPC or target, or may be dependent on environmental conditions such as weather, temperature, or time of day; and contour of or obstacles in the immediate terrain, which may affect physics such as movement speed and balance. An interaction may have sub-interactions that must be performed, or may trigger other interactions during or after execution. For example, when an NPC tries to perform the "eat" interaction on another NPC, the initiating NPC must first kill the target NPC, so the "eat" interaction will first invoke the "combat" interaction described below and, if the initiating NPC kills the target NPC, the "eat" interaction converts the target NPC into a food item and then removes the instantiation, and increases the fulfillment of the initiating NPC's "hunger" need. In addition to changing values within existing parameters of the initiating NPC, interactions may add or remove parameters, such as need objects (see the example "teach" interaction above).

An initiating NPC may have, as an element of its NPC object, an array or list of interactions the NPC is capable of performing. Interactions may be added to or removed from this list as the NPC's parameter values change. Alternatively, interactions may be linked to each default type of need object, so that each NPC that acquires a particular need will be able to perform the interactions necessary to fulfill that need. Further, each item type may have associated a list of interactions that may be performed on it.

Once an NPC is instantiated in a particular world location, and with a particular starting set of needs, the NPC's behavior is automatically simulated according to its hierarchy of needs, the fulfillment status of those needs, and the NPC's interactions with its surroundings. An NPC develops individually, and a society of NPCs develops collectively, as a consequence of each NPC's behaviors and actions caused by those behaviors over time. Some developmental features are described below without limitation.

Knowledge Progression

As described above, an NPC's store of knowledge may comprise an awareness level for each observable science in the virtual world. For a particular science, performing an interaction indicated in the static list for the science will cause the NPC's awareness level of that science to increase. Increased awareness may lead to access to new sciences, technology, items, interactions, and efficiencies depending on the awareness being gained. For example, a "cook" interaction may include a subtask of "boil water." Boiling water may increase the NPC's awareness of thermodynamics. Further, if the NPC's awareness of thermodynamics is sufficiently high to make the NPC aware of vaporization, boiling water may also increase the NPC's awareness of vaporization. Once a certain level of awareness of vaporization is achieved, the NPC becomes aware of how to construct a boiler. Constructing the boiler then gives the NPC awareness of materials related thereto, such as metalworking and combustion. NPCs may also gain awareness in a science by learning it from another NPC (see the example "teach" interaction above).

The overall awareness of a science within a specific population may also be tracked by the engine. The population may gain access to scientific advances that affect the population as a whole, such as economic and political sciences. Thus, knowledge progression may affect societal development as described below. Further, as some sciences may include social interactions as a means for gaining awareness, societal development may in turn affect knowledge progression.

Physical Progression and Combat

As described above, an NPC's physical composition may be instantiated according to a template corresponding to the NPC's entity type. Thereafter, the NPC's physical composition may be individualized by applying one or more modifiers to affect size, weight, muscle density, and other physical factors. Through engagement in interactions, an NPC may improve the effect of one or more of these modifiers. Simply put, performing physical tasks may increase the NPC's strength, agility, balance, damage resistance, and the like.

Methods for applying positive or negative effects of physical interactions may include one or more of the following, in any suitable combination and without limitation: increasing or decreasing the value of an overall modifier, which may affect an overall "experience" attribute or may evenly improve or deteriorate the density of all muscle tissues; increasing or decreasing a modifier for an individual statistic, such as "agility," "strength," or "constitution," which may be hard-coded to affect certain tissues or affect all tissues in different increments; and directly increasing or decreasing a density modifier or other modifier for specific tissues involved in the interaction.

Physical combat between one or more NPCs may affect each NPC involved positively, negatively, or both positively and negatively. That is, combat may increase physical composition and proficiency according to the above methods, where interactions such as swinging a weapon, biting, running, and lifting can improve one or more modifiers. Combat may also degrade tissues, including skin, muscle, and bones, if the NPC is struck with blunt or piercing damage. Physical proficiency may also affect the NPC's performance in combat. In one embodiment, real-world physical equations are modeled by the engine to determine outcomes of combat. Thus, strength and agility, which may be related to muscle density, of an NPC may be used to calculate, for example, the rate at which the NPC accelerates its weapon. In another example, muscle density may be used to determine flexural strength of a body part as it is impacted by a weapon: a high flexural strength will resist tearing of the tissue, but may allow some force of the impact to travel to deeper tissue layers and cause damage; a low flexural strength may tear more quickly, and upon tearing may allow impacts to pass through it to deeper tissue levels without attenuating the force. The engine may represent an attacking NPC's weapon with a line equation drawn in a three dimensional space containing the spatial arrangement of a defending NPC's body part objects. The attack path may be represented by a second line equation, drawn to determine the location on the defending NPC's spatial arrangement of body parts the attack will strike. The effect on the tissues within the impacted body parts may then be calculated.

Societal Development

According to the needs and dispositions of a population of NPCs, the NPCs may cooperate to complete tasks in satisfaction of their needs. The development of a society of NPCs may be hard-coded, such as by pre-programming the instantiation of specially configured NPCs in close proximity to each other. In one embodiment, one or more NPCs in the population may be configured with a need to educate other NPCs of its entity types. The educator NPCs may disseminate other social goals, or such social goals may be assigned to one or more other NPCs in the population at instantiation. Social goals may include the construction of special purpose buildings, collection of a particular type of resources, organizational endeavors such as the formation of governments, military units, hunting parties, gangs, or church congregations, and other collective goals. The resulting population will cooperate to perform individually or mutually beneficial tasks, and may propagate through instantiation of children having the same predispositions, provided an external force does not eliminate the population.

In another embodiment, societies may form naturally, provided NPCs with at least basic communal needs meet each other in the virtual world. Through performance of tasks, a population of two or more NPCs may gradually advance scientifically, so that eventually an NPC may gain a need to educate or to perform other social tasks as described above.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiments disclosed, but that the invention will include all embodiments falling within the scope of the appended claims.

What is claimed is:

1. A method of simulating a virtual world, the method comprising:

processing, by a simulation engine running on a simulating computer and having access to a database storing a plurality of terrain configurations each identified by one of a plurality of characters, one or more map nodes in a map of the virtual world, each map node having a map set comprising an array of various ones of the characters, the processing including using the array to identify one or more of the plurality of terrain configurations and inserting the identified one or more terrain configurations into the virtual world;

wherein processing the map nodes comprises, for each map node, stacking vertically, in the order in which the characters appear in the array of the map set, the terrain configuration associated with each character.

2. A method of simulating a virtual world, the method comprising:

processing, by a simulation engine running on a simulating computer and having access to a database storing a plurality of terrain configurations each identified by one of a plurality of characters, one or more map nodes in a map of the virtual world, each map node having a map set comprising an array of various ones of the characters, the processing including using the array to identify one or more of the plurality of terrain configurations and inserting the identified one or more terrain configurations into the virtual world;

wherein processing the map nodes comprises modifying the map set by:
identifying, from the terrain configurations represented by the map set, an existing terrain configuration to be modified;
identifying a desired modification; and
searching the database of the terrain configurations for a replacement terrain configuration that best matches the existing terrain configuration as modified by the desired modification.

3. The method of claim 2 wherein each of the terrain configurations represented by the map set is classified according to a classification scheme, and wherein searching the database comprises identifying a classification in the classification scheme that contains the replacement terrain configuration.

4. The method of claim 2 wherein modifying the map set includes replacing the character of the existing terrain configuration with the character of the replacement configuration and iterating the map node.

5. The method of claim 1 wherein the map node further comprises a composition array that describes one or more materials positioned at sequential heights in the map node, the heights corresponding to terrain configuration positions in the map set.

6. The method of claim 2 wherein processing the map nodes further comprises, for each map node, determining whether one or more non-player character (NPC) objects are present and iterating one or more of the NPC objects that are present.

7. The method of claim 6 wherein each of the one or more NPC objects comprises a hierarchy of needs referencing one or more need objects.

8. The method of claim 7 wherein the need objects comprise one or more tasks that the NPC object must complete to achieve fulfillment of the need object.

9. The method of claim 6 wherein each of the one or more NPC objects comprises a genetic code comprising an array of genetic attributes.

10. A method of simulating a virtual world, the method comprising:
processing, by a simulation engine running on a simulating computer, one or more map nodes in a map of the virtual world, each map node comprising one or more non-player character (NPC) objects each comprising a hierarchy of needs that is a variable data structure containing one or more references to various ones of a plurality of need objects, the processing including simulating a behavior in the virtual world of each of the NPC objects based on the hierarchy of needs of the NPC object;
wherein the need objects comprise one or more tasks that the NPC object must complete to achieve fulfillment of the need object.

11. The method of claim 10 wherein each NPC object further comprises a genetic code comprising an array of genetic attributes.

12. The method of claim 10 wherein processing the map nodes comprises reordering the hierarchy of needs for any NPC object that has achieved fulfillment of one of the need objects.

13. The method of claim 10 wherein one or more of the tasks comprises an interaction having a target, and wherein completing the tasks comprising an interaction comprises performing the interaction on the target.

14. The method of claim 13 wherein the NPC object further comprises a store of knowledge comprising an awareness value for one or more sciences, and wherein completing any of the tasks comprises increasing one or more of the awareness values.

15. The method of claim 10 wherein processing the map nodes comprises adding a need object to the hierarchy of needs of one or more of the NPC objects.

16. The method of claim 10 wherein each map node has a map set comprising an array of characters, wherein each character is associated with a stored terrain configuration.

17. The method of claim 16 wherein processing the map nodes comprises:
determining if an interaction of any of the NPC objects with any of the terrain configurations in the map set requires modifying the terrain configuration;
searching the database of the stored terrain configurations for a replacement terrain configuration that best matches the terrain configuration being modified; and
replacing the character of the terrain configuration being modified with the character of the replacement terrain configuration.

18. The method of claim 16 wherein the map node further comprises a composition array that describes one or more materials positioned at sequential heights in the map node, the heights corresponding to terrain configuration positions in the map set.

* * * * *